United States Patent
van Nieuwstadt

(10) Patent No.: US 7,017,338 B2
(45) Date of Patent: Mar. 28, 2006

(54) DIESEL PARTICULATE FILTER PRESSURE MONITOR

(75) Inventor: Michiel van Nieuwstadt, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 107 days.

(21) Appl. No.: 10/700,225

(22) Filed: Nov. 3, 2003

(65) Prior Publication Data

US 2005/0091970 A1    May 5, 2005

(51) Int. Cl.
*F01N 3/00*    (2006.01)

(52) U.S. Cl. .................. 60/297; 60/276; 60/285; 60/311; 422/169

(58) Field of Classification Search ............... 60/274, 60/276, 285, 286, 297, 301, 311, 295; 55/DIG. 30; 73/118.1; 422/169, 170, 171, 177
See application file for complete search history.

(56) References Cited

U.S. PATENT DOCUMENTS

| | | | |
|---|---|---|---|
| 4,424,671 A * | 1/1984 | Tokura ..................... | 60/274 |
| 4,549,399 A * | 10/1985 | Usui et al. ................. | 60/286 |
| 4,665,690 A * | 5/1987 | Nomoto et al. ............ | 60/286 |
| 5,373,733 A * | 12/1994 | Fuchs et al. ............... | 73/118.1 |
| 5,826,425 A * | 10/1998 | Rossi Sebastiano et al. .. | 60/274 |
| 6,023,930 A * | 2/2000 | Abe et al. .................. | 60/311 |
| 6,167,696 B1 * | 1/2001 | Maaseidvaag et al. ...... | 60/274 |
| 6,233,927 B1 * | 5/2001 | Hirota et al. .............. | 60/297 |
| 6,615,580 B1 * | 9/2003 | Khair et al. ............... | 60/286 |
| 2003/0167757 A1 * | 9/2003 | Boretto et al. ............. | 60/295 |

FOREIGN PATENT DOCUMENTS

| | | | |
|---|---|---|---|
| JP | 57148016 A | * | 9/1982 |
| JP | 08284638 A | * | 10/1996 |
| JP | 2000024440 A | * | 1/2000 |

OTHER PUBLICATIONS

SAE 2001-01-0909; "Intertial Contributions to the Pressure Drop of Diesel Particulate Filters"; Konstandopoulos et al.; SAE World 2001 Congress, Detroit, MI, Mar. 5-8, 2001.

SAE 2000-01-1016; "Fundamental Studies of Diesel Particulate Filters: Transient Loading, Regeneration and Aging"; Konstandopoulos et al.; SAE 2000 World Congress, Detroit, MI, Mar. 6-9, 2000.

* cited by examiner

*Primary Examiner*—Tu M. Nguyen
(74) *Attorney, Agent, or Firm*—Julia Voutyras; Allan J. Lippa

(57) ABSTRACT

A low cost particulate filter pressure monitoring system and method are presented. The differential pressure across the filter is estimated based on an atmospheric pressure, a measured absolute exhaust gas pressure upstream of the first emission control device coupled to the engine and an estimated pressure drop across all other emission control devices.

5 Claims, 3 Drawing Sheets

DIESEL PARTICULATE FILTER PRESSURE MONITOR

FIELD OF THE INVENTION

The present invention relates to a system and a method of monitoring a Particulate Filter (PF), and more particularly, to estimating differential pressure across the PF based on an absolute pressure measurement upstream of the first emission control device coupled to the engine.

BACKGROUND OF THE INVENTION

Diesel engines can use particulate filters (PFs) to reduce soot emissions. These filters trap particulate matter that is contained in the exhaust gasses passing through the filter. Periodically, when the filters become full of soot, they are regenerated by raising exhaust gas temperature to the point where the soot is burned. In this way, the filter is again able to retain soot and overall soot emissions are reduced.

Filter regeneration can be controlled based on differential pressure measured across the filter. As more and more soot is stored, a larger differential pressure is measured. See, for example, U.S. Pat. No. 6,405,528, wherein the differential pressure across the filter is determined based on measurements provided by a pair of pressure sensors positioned upstream and downstream of the particulate filter. Once soot accumulation has reached a predetermined level, regeneration of the filter can be initiated. Filter regeneration is accomplished by heating the filter to a temperature that will burn soot particles at a faster rate than the deposition of new soot particles, for example, 400–600° C.

The inventors herein have recognized a disadvantage with the prior art approach. In particular, in order to determine differential pressure across the particulate filter, either two absolute pressure sensors or a differential pressure sensor with two pressure tabs is required to be placed near the filter, which results in high material and installation costs. Further, that the under-body placement of the pressure sensors exposes them to external weather conditions, such as rain, snow, dirt, and cold temperatures, and may therefore degrade their performance. This sensor degradation can result in erroneous pressure measurement, which, in turn, may cause either too frequent, or too infrequent, particulate filter regeneration. Too frequent regeneration (from an erroneously high reading) can result in decreased fuel economy as energy is needlessly spent raising exhaust gas temperatures. Likewise, too infrequent regeneration (from an erroneously low reading) can result in impaired drivability. Further, a degraded sensor output can result in erroneous determinations that the particulate filter itself has become degraded, thereby resulting in unnecessary replacement filter costs.

SUMMARY OF ASPECTS OF THE INVENTION

In one aspect of the invention, the disadvantages of prior art approaches are overcome by a diagnostic system for an emission control system coupled downstream of an internal combustion engine, the emission control system including at least a particulate filter, the diagnostic system including: a sensor providing a signal indicative of an exhaust gas pressure upstream of the emission control system; and a computer storage medium having a computer program encoded therein, comprising: code for estimating a pressure drop across the particulate filter based on at least said sensor signal.

In another aspect of the present invention, the emission control system also includes an oxidation catalyst coupled upstream of the particulate filter, and a Lean NOx Trap coupled downstream of the particulate filter.

In yet another aspect of the present invention, the differential pressure across the particulate filter is further estimated based on the atmospheric pressure and a model of the differential pressure across the oxidation catalyst, the LNT, and the muffler.

In this way, installation and material costs are reduced through the use of just one sensor. Further, the sensor may be placed in the engine compartment upstream of the emission control system, and is therefore shielded from adverse weather conditions. Thus, improved system reliability and emission control, as well as reduced costs can be achieved.

BRIEF DESCRIPTION OF THE DRAWINGS

The advantages described herein will be more fully understood by reading examples of an embodiments in which the invention is used to advantage, with reference to the drawings, wherein.

DESCRIPTION OF EMBODIMENT(S)

Figure 1A:
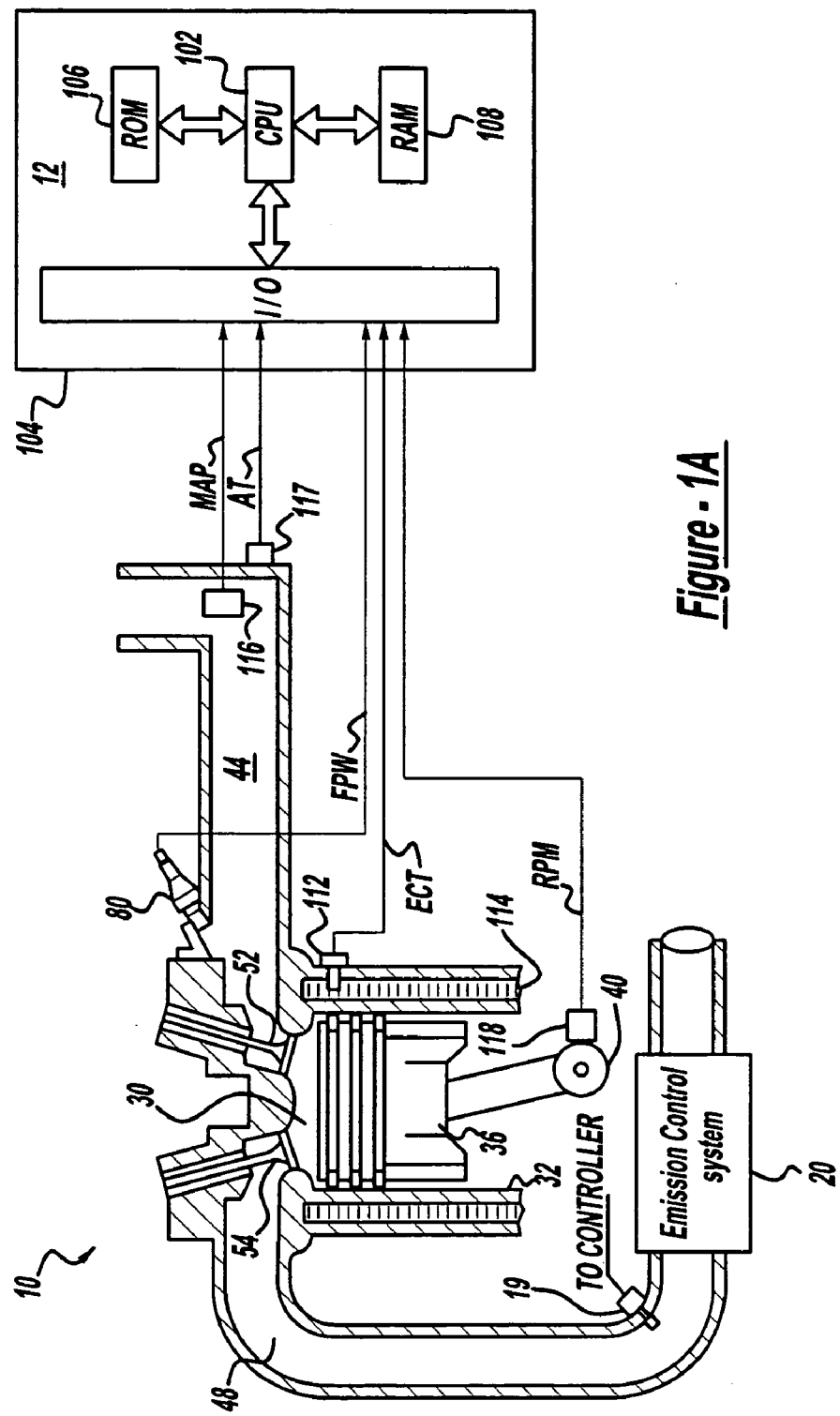
FIGS. 1A and 1B are schematic diagrams of an engine wherein the invention is used to advantage.

Internal combustion engine 10, comprising a plurality of cylinders, one cylinder of which is shown in FIG. 1A, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Intake manifold 44 is also shown having fuel injector 80 coupled thereto for delivering liquid fuel in proportion to the pulse width of signal FPW from controller 12. Both fuel quantity, controlled by signal FPW and injection timing are adjustable. Fuel is delivered to fuel injector 80 by a fuel system (not shown), including a fuel tank, fuel pump, and fuel rail. Compression ignition combustion is primarily utilized in engine 10.

Controller 12 is shown in FIG. 1A as a conventional microcomputer including: microprocessor unit 102, input/output ports 104, read-only memory 106, random access memory 108, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a measurement of manifold pressure (MAP) from pressure sensor 116 coupled to intake manifold 44; a measurement (AT) of manifold temperature from temperature sensor 117; an engine speed signal (RPM) from engine speed sensor 118 coupled to crankshaft 40. Additionally, controller 12 receives a signal from sensor 19, which is coupled to an exhaust gas manifold upstream of the emission control system 20 and provides a signal indicative of the exhaust gas pressure upstream of the emission control system. In this example, sensor 19 is an absolute pressure sensor.

Figure 2:
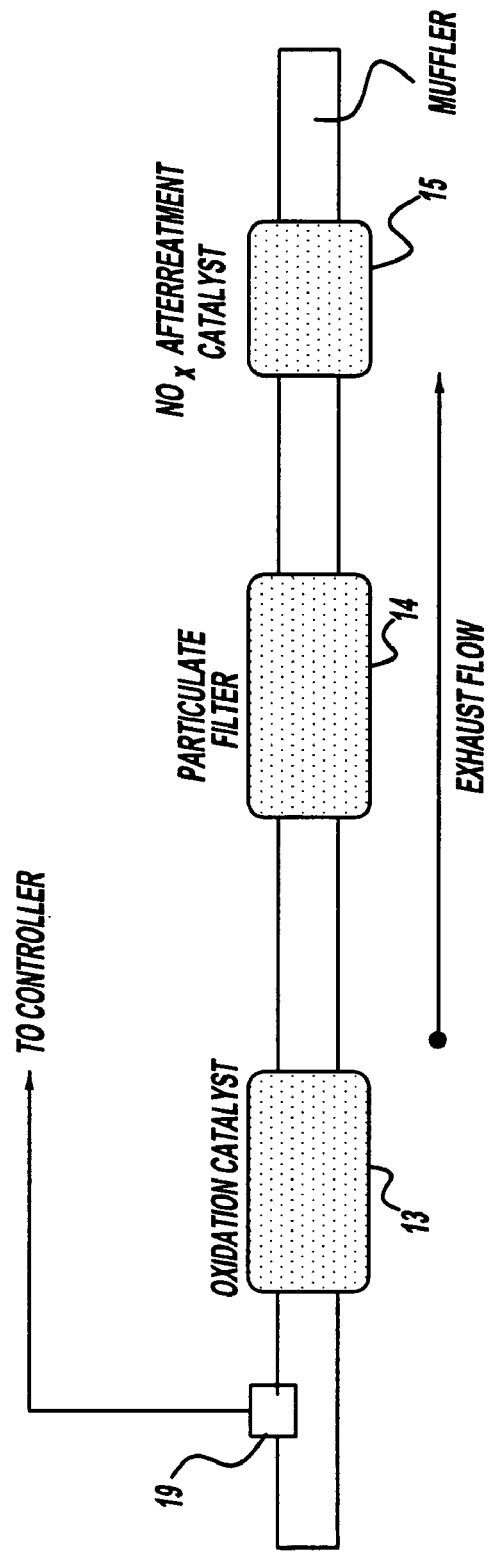
FIG. 2 is a schematic diagram of an exemplary embodiment of an emission control system in accordance with the present invention.

An emission control system 20 is coupled to an exhaust manifold 48 and an exemplary embodiment of the system in accordance with the present invention is described with particular reference to FIG. 2.

Figure 1B:
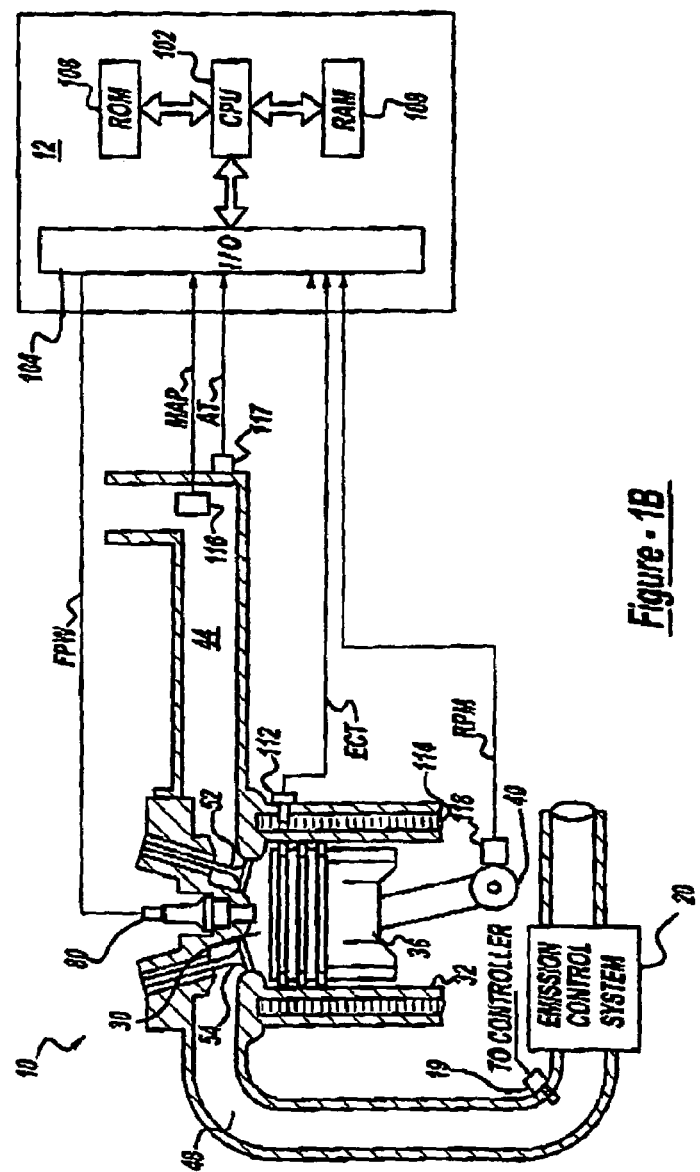

Referring now to FIG. 1B, an alternative embodiment is shown where engine 10 is a direct injection engine with injector 80 located to inject fuel directly into cylinder 30. Fuel is delivered to fuel injector 80 by a fuel system (not shown), including a fuel tank, fuel pump, and high-pressure common rail system.

In one example, engine 10 is a diesel-fueled engine that operates with stratified charge combustion in excess oxygen conditions. Alternatively, fuel timing adjustments, and multiple fuel injections, can be utilized to obtain homogeneous charge compression ignition combustion. While lean operation it utilized, it is also possible to adjust engine conditions to obtain stoichiometric or rich air-fuel ratio operation.

In another alternative embodiment, a turbocharger can be coupled to engine 10 via the intake and exhaust manifolds.

Referring now to FIG. 2, the emission control system 20 includes a particulate filter 14 coupled downstream of an oxidation catalyst 13. Catalyst 15 is shown coupled downstream of the particulate filter 14. Catalyst 15, in this example, is a Lean NOx Trap (LNT), a NOx absorbent type catalyst that stores NOx in an oxygen rich environment, and releases/reduces stored NOx in an oxygen deficient environment. In an alternative embodiment (not shown), catalyst 15 may be a urea-based Selective Catalytic Reduction (SCR) catalyst. In yet another alternative embodiment (not shown), catalyst 15 may be placed upstream, rather than downstream of the particulate filter, and may be an LNT or and SCR catalyst.

Oxidation catalyst 13 is a precious metal catalyst, preferably one containing platinum, for rapid conversion of hydrocarbons (HC), carbon monoxide (CO) and nitrous oxide (NO) in the engine exhaust gas. The oxidation catalyst is also used to supply heat for fast warm up of the particulate filter 14, which is done by increasing the HC concentration in the exhaust gas entering the oxidation catalyst, wherein an exotherm is created when the extra HC is reduced over the oxidation catalyst. This can be accomplished through, for example, in-cylinder injection during either or both of a power or exhaust stroke of the engine (in a direct injection engine) or any of a number of other alternatives, such as retarding injection timing, increasing EGR and intake throttling, or any other means known to those skilled in the art to increase the HC concentration in the exhaust gas. Alternatively, hydrocarbons may be injected directly into the exhaust gas stream entering the oxidation catalyst employing any means known to those skilled in the art.

Particulate filter (PF), in one example a diesel particulate filter (DPF) 14, is coupled downstream of the oxidation catalyst 13 and is used to trap particulate matter (soot) generated during the drive cycle of the vehicle. The PF can be manufactured from a variety of materials including cordierite, silicon carbide, and other high temperature oxide ceramics. The PF collects soot through a wall filtering process. It is possible to monitor the amount of soot in the PF by monitoring the pressure drop across it. The pressure drop consists of contraction and expansion losses, frictional losses of the flow along the walls, and pressure losses due to the flow through a porous medium. Once soot accumulation has reached a predetermined level, regeneration of the filter can be initiated. Filter regeneration is accomplished by heating the filter to a temperature that will burn soot particles at a faster rate than the deposition of new soot particles, for example, 400–600° C.

The inventors herein have recognized that the pressure drop across the particulate filter can be estimated based on a measurement of an exhaust gas pressure upstream of the emission control system 20 provided by the absolute pressure sensor 19. This measurement, $P_{absolute}$, reflects the sum of the atmospheric pressure, $P_{atm}$, and $\Delta P_{total}$:

$$P_{absolute} = P_{atm} + \Delta P_{total}$$

wherein the atmospheric pressure measurement, $P_{atm}$, can be determined independently, for example, based on a MAP sensor reading during vehicle start, and $\Delta P_{total}$ is the cumulative pressure drop across all devices (such as, for example, the oxidation catalyst, particulate filter, LNT and muffler) that are part of the emission control system 20:

$$\Delta P_{total} = \Delta P_{ox\_cat} + \Delta P_{PF} + \Delta P_{LNT} + \Delta P_{muffler}$$

Since none of the emission control devices other than the particulate filter change their pressure characteristics over time, the pressure drop across those devices can be modeled as a function of volumetric flow (F) in accordance with the following equation:

$$\Delta P_{device} = c_{0\_dev} + c_{1\_dev} \cdot F + c_{2\_dev} \cdot F^2$$

Alternatively, a different model known to those skilled in the art can be used to model the pressure drop over the device. The differential pressure drop across the particulate filter can be expressed as:

$$\Delta P_{PF} = P_{absolute} - P_{atm} - \Delta P_{ox\_cat} - \Delta P_{LNT} - \Delta P_{muffler}$$

Therefore, according to the present invention, it is possible to eliminate a direct differential pressure measurement across the particulate filter. Instead, differential pressure across the particulate filter can be estimated as the difference between an absolute pressure measurement upstream of the first emission control device in the emission control system, the barometric pressure, and an estimate of the pressure drop across the rest of the devices in the emission control system.

This concludes the description of the invention. The reading of it by those skilled in the art would bring to mind many alterations and modifications without departing from the spirit and the scope of the invention. Accordingly, it is intended that the scope of the invention be defined by the following claims:

I claim:

1. An emission control system for a diesel engine, comprising:
    an oxidation catalyst coupled downstream of the engine;
    a particulate filter coupled downstream of said oxidation catalyst;
    a lean NOx trap coupled downstream of said particulate filter; and a computer providing an indication that particulate filter regeneration is required based at least on a signal from an exhaust gas sensor coupled only upstream of said oxidation catalyst, said computer further regenerating said particulate filter in response to said indication.

2. The system as set forth in claim 1 wherein said signal provided by said sensor coupled upstream of said oxidation catalyst is indicative of an exhaust gas pressure upstream of said diesel particulate filter.

3. The system as set forth in claim 2 wherein said sensor is an absolute pressure sensor.

4. The system as set forth in claim 3 wherein said indication that particulate filter regeneration is required is further based on an atmospheric pressure.

5. The system as set forth in claim 4 wherein said atmospheric pressure is calculated based on a Manifold Absolute Pressure sensor reading during vehicle start.

* * * * *